April 15, 1969 R. L. MILLARD ET AL 3,438,531

PLASTIC BUNG FOR A BEER BARREL

Filed July 3, 1967 Sheet 1 of 2

INVENTOR.
Raymond L. Millard
Arthur W. Tschannen
BY Van Valkenburgh & Lowe
ATTORNEYS United States Patent Office 3,438,531
Patented Apr. 15, 1969

3,438,531
PLASTIC BUNG FOR A BEER BARREL
Raymond L. Millard, Evergreen, and Arthur W. Tschannen, Wheatridge, Colo., assignors, by mesne assignments, to Adolph Coors Company, Golden, Colo., a corporation of Colorado
Filed July 3, 1967, Ser. No. 650,791
Int. Cl. B65d 39/04, 39/12
U.S. Cl. 217—110                2 Claims

ABSTRACT OF THE DISCLOSURE

A plastic bung, sized and formed to be driven rim first into the tapered bung orifice of a beer barrel. The plastic bung plug, formed as an inverted cup-shaped member, includes a top, a cylindrical wall, a seal ridge about the wall, and a tapered, enlarged, shouldered head at the base. This head is adapted to guide and to lock the bung into a bung orifice. The shoulder of this head is adapted to squeeze the wall at the seal ridge portion when the bung is being driven into an orifice to thereby protect this seal ridge. Preferably, the base end of the bung is formed with a small central crater adapted to guide an extractor into the bung.

---

This invention relates to plastic bungs for beer barrels.

Plastic bungs and stoppers of various types are now common items of merchandise, and such have been proposed from time to time for bunging beer barrels. Beer barrel bungs are commonly made of wood, such as selected grades of poplar or gum. However, the extensive consumption of beer since the repeal of prohibition has reduced the supply of choice material for these bungs to the point it is becoming scarce and expensive.

Bungs of synthetic resin materials, especially polyethylene, would seem to be ideally suited for the purpose, and a number of different types have been proposed, as exemplified by the following U.S. patents:

V. Alvear, No. 2,657,817, issued Nov. 3, 1953; E. R. Goll, No. 2,886,203, issued May 12, 1959; M. L. Geiser, et al., No. 2,930,643, issued May 31, 1960; E. R. Goll, No. 3,028,036, issued Apr. 3, 1962.

However, in every instance, these prior art constructions cannot meet the severe criterions of being leakproof in at least 99.9 percent of the barrels bunged and only in the E. R. Goll patent, No. 3,028,036, is there a disclosure which proposes a bung adapted to fit the standard tapered bung orifice in a beer barrel.

The present invention was conceived and developed to meet an increasing need for a plastic bung for beer barrels which will fit into a standard bung orifice and which will not leak, when used in the production line use at a brewery, where the bung orifices are often scratched, marred and pitted, and where the operation of bunging the barrels is necessarily done in a quick and sometimes abusive manner.

The invention comprises, in essence, a bung plug having a circular wall section sized and tapered to fit a standard bung orifice, and an oversized, tapered, conical skirt at the leading rim of this wall adapted to guide and subsequently lock the bung in the orifice. A seal ring circumscribes and outstands from the wall adjacent to the skirt and is in functional juxtaposition therewith, for the skirt protects the seal from scraping against the sides of the bung orifice until the bung is finally positioned.

It follows that the primary object of the invention is to provide a novel and improved plastic bung which may be fitted into an ordinary bung orifice in a beer barrel and will not thereafter leak.

Another object of the invention is to provide a novel and improved bung formed of a selected type of synthetic resin plastic material which combines the desirable properties of rigidity, resilience and the ability to cold flow at moderately high stresses, and which is formed and proportioned to stress the sealing portion of the bung against the walls of an orifice, by a resilient pressure in the body of the bung, with pressure sufficient to deform and to cold flow the sealing portion to produce a tight, leakproof fit.

Another object of the invention is to provide a novel and improved leakproof bung of such synthetic resin which will reliably seal a bung opening in a beer barrel that is scratched, pitted, marred or otherwise made irregular by use and abuse.

A further object of the invention is to provide a novel and improved bung for a beer barrel which is adapted to be securely fitted into the bung orifice of the barrel without contacting, sliding or otherwise damaging the sealing portion of the bung against the wall of the bung orifice while the bung is being driven into place in the bung orifice.

With the foregoing and other objects in view, all of which more fully hereinafter appear, our invention comprises certain constructions, combinations and arrangements of parts and elements as hereinafter described, defined in the appended claims, and illustrated in preferred embodiment in the accompanying drawings, in which:

Figure 1:
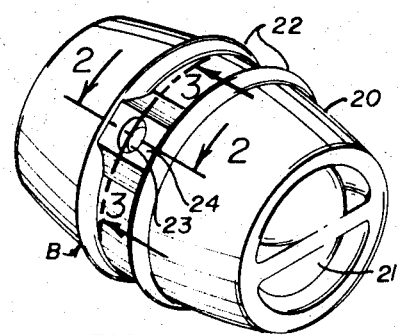
FIG. 1 is a perspective view of a typical beer barrel showing the reinforcing pad wherein the bung orifice is located.
Figure 6:
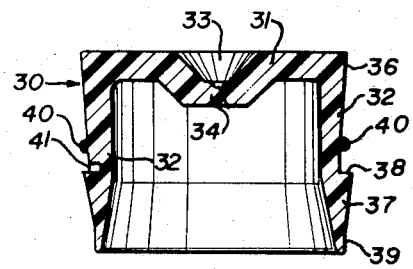
FIG. 6 is a transverse, sectional view, as taken from the indicated line 6—6 at FIG. 4.
Figure 5:
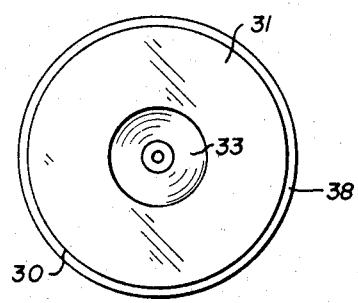
FIG. 5 is a plan view of the bung.
Figure 4:
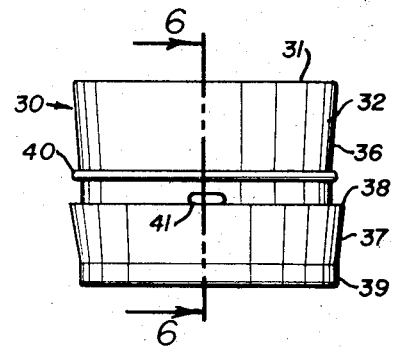
FIG. 4 is a side elevational view of the improved bung.

Referring more particularly to the drawings, the beer barrel B shown at FIG. 1, illustrates a type in common use, enlarged at the equator and being similar in appearance to a wood stave type barrel. The barrel is built of preformed aluminum plates and shells which are welded together as a unitary construction. It includes a bulging, circumferential wall 20 having each end closed by an end plate 21. A pair of rolling rings 22 are formed about the body of the barrel at each side of the equator, to facilitate rolling it along a straight course. Each barrel has several openings in it, including a bung orifice 23 at the equator of the wall 20 for filling the barrel at the brewery. This bung orifice is formed in a pad or box 24 welded to the body of the barrel between the rolling rings 22, to increase the thickness of the barrel wall at the orifice 23 to approximately ¾ inch.

Figure 2:
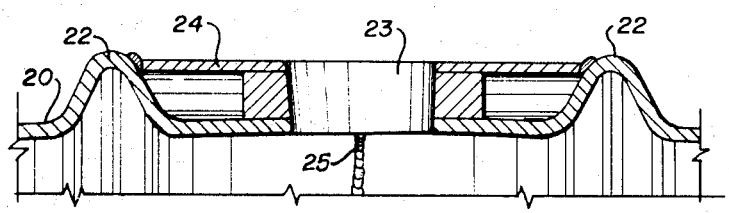
FIG. 2 is a fragmentary, longitudinal, sectional view through the bung pad, as taken from the indicated line 2—2 at FIG. 1, but on an enlarged scale.
Figure 3:
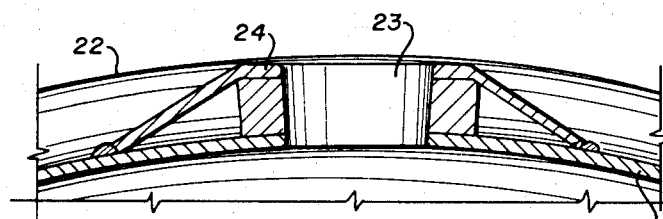
FIG. 3 is a fragmentary, transverse sectional view through the bung pad as taken from the indicated line 3—3 at FIG. 1, but on an enlarged scale.

The bung orifice 23 is tapered inwardly on a small taper, as illustrated at FIGS. 2 and 3. This orifice is formed by a rolling operation which ordinarily provides a hard, smooth surface, but with some dimensional irregularity. The orifice is finished by a suitable chamfer at both the inner and outer edges. However, the inward edge of this bung orifice 23 is not flat, but it is arched to conform with the shape of the beer barrel, as indicated at FIG. 3, and often, this inner edge is quite irregular. For example, to add to such irregularity, an equatorial weld 25, holding parts of the barrel together, intersect the orifice.

Scratches, pit marks and small grooves in the bung orifice 23 create a serious problem in sealing the closure. A wooden bung or plug will swell when it is wetted, and will thereby yield to tightly seal any irregularities in the wall of the orifice. However, it has been found that such irregularities and variations in the diameter and shape of a bung orifice cause a serious problem when a plastic bung is used in lieu of a wooden plug, for whenever a plastic plug is made of material sufficiently rigid and strong enough to withstand the pressures involved, it is too hard to flow into the irregularities of a bung orifice to assure an effective seal.

The improved bung 30 is formed of selected synthetic thermoplastic resin which may be molded into a comparatively rigid structure, but which is, nevertheless, highly elastic and pliable when subjected to moderate stresses. It must also be capable of permanently yielding and deforming whenever it is subjected to stresses somewhat greater than that required to deflect the material. The material must be tough and capable of withstanding shock and impact, because ordinarily a bung will be driven into the barrel orifice by striking it with a mallet. Also, other necessary qualities concern approval by the Food and Drug Administration because the material must not impart taste to the beer and must be acceptable for contact with a potable liquid. A thermoplastic polyolefin resin, commonly known as a medium density type of polyethylene, such as type 3250 manufactured by the Phillips Petroleum Company, was found to have a suitable combination of the above-noted desirable features. The term "polyethylene" will hereinafter be used to designate a material of this general type.

The improved bung 30, which can be described as an inverted cup-like member, made of polyethylene, is a comparatively thick-walled member with a thickened top end 31 and a thick substantially-cylindrical sidewall 32 depending therefrom. The bung must be not only capable of withstanding the hydrostatic pressure of carbonated beer within the keg, but also, of withstanding a sharp blow of a mallet when the bung is being driven into a barrel orifice 23. The top end 31 has approximately the same diameter as the entrance of a bung orifice, and its thickness is sufficient to impart rigidity to this top portion. Such thickness may be approximately $\frac{1}{8}$ the bung diameter. An axially centered crater 33 is provided at the center of this top and the underside, within the cup, forms a downward dimple 34. This crater structure is formed in the bung to facilitate the centering of an extracting tool when the bung is to be removed from the orifice 23 in a barrel.

The inner surface of the circular wall 32 connects with the top 31 at a suitable radius to elimiate a stress-producing inside corner. The outer surface 36 of this sidewall 32 is sized and shaped to provide a snug fit in a standard bung orifice, and accordingly, is tapered inwardly in the downward diretion at a small angle, essentially the same as the bung orifice 23. Also, the height of this surface is approximately the same as the thickness or depth as the bung orifice.

Figure 7:
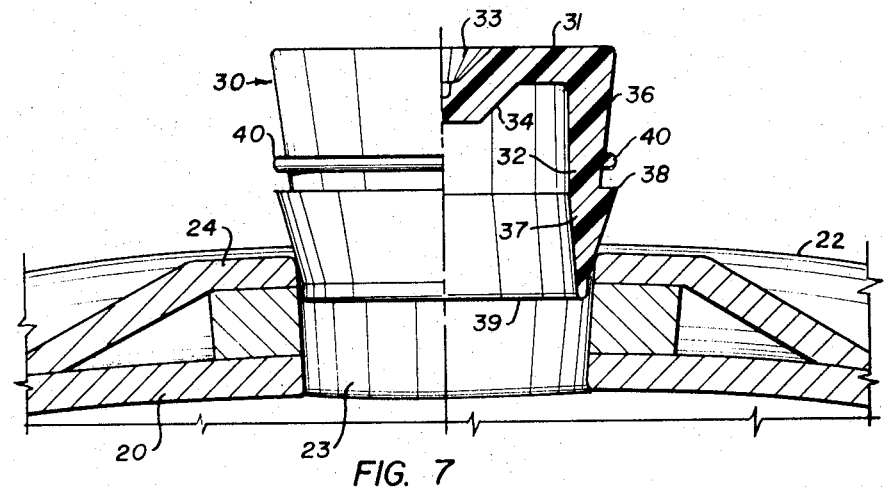
FIG. 7 is a fragmentary portion of the showing at FIG. 3, but on an enlarged scale, depicting the bung orifice in section and a bung, partly in section, set upon the orifice preliminary to driving it into the orifice.

The sidewall 32, below the tapered portion 36, forms an enlarged skirt 37 which will extend below the bottom rim of an orifice 23 when the bung is in place. The juncture between the tapered portion 36 and the skirt 37 forms a shoulder 38 which functions as a lock to hold the bung in place in an orifice 23, as illustrated at FIG. 9. From the thick portion at the shoulder 38, the skirt 37 is sharply tapered to a minimum thickness at the bottom rim 39. The outside diameter of this rim 39 is less than the diameter at the top of a bung orifice 23 to permit the bung to be easily fitted into an orifice 23 preparatory to driving it in place in the orifice, as illustrated at FIG. 7. When so placed, the bung will be hit by a heavy hand mallet or mechanical hammer to drive the bung 30 completely into the bung orifice so that the top 31 will be flush with the top of the bung orifice, and the skirt 37 will be below the orifice and within the barrel, as illustrated at FIG. 9. This driving action is necessarily accompanied by a resilient squeezing of the enlarged head 37 when it is in the orifice, as illustrated at FIG. 8, and the skirt 37 snaps outwardly as it passes through the orifice to lock in position, all as will now be further described.

A narrow, rounded seal ridge 40 circumscribes the wall portion 36 a short distance above the shoulder 38. This seal ridge 40 outstands from the wall surface at a distance slightly less than the width of the shoulder 38 which may be approximately $\frac{1}{16}$ inch. It is of a corresponding thickness, approximately $\frac{1}{16}$ inch, and is preferably rounded in form to eliminate sharp lips or edges so that the rounded surface will contact the wall of a bung orifice 23 when the bung is in place. It is to be noted that the sealing action of the bung in the orifice relies upon the surface of the ridge contacting the wall of a bung orifice with sufficient pressure and tightness as to cold flow the resin material of the bung.

Figure 8:
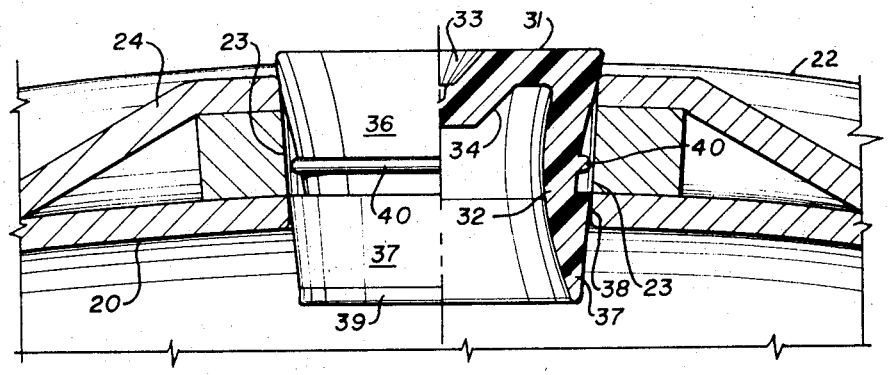
FIGS. 8 and 9 are enlarged, fragmentary, sectional views similar to FIG. 7, but showing the bung within the bung orifice, as it appears at certain positions when it is being driven into place in the orifice.
Figure 9:
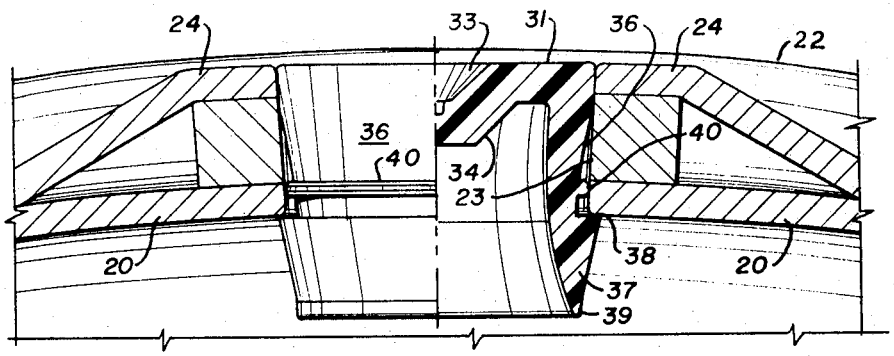

FIGS. 7 through 9 illustrate the action of the bung 30 as it is being driven into an orifice 23. The bung is placed into position as shown in FIG. 7, with the lower rim 39 being set in the tapered orifice 23. As the bung 30 is partway in the orifice, as illustrated at FIG. 8, the head is squeezed to a reduced diameter, and the wall portion 36 immediately above the shoulder 38 is pulled inwardly and is also reduced in diameter because of the continuity of the material forming the bung 30. The seal ridge 40 must be in this reduced-diameter wall portion 36 and will also be reduced in diameter to the point where it does not significantly contact the orifice wall 23 when the bung is being driven into place. This is to protect the seal ridge 40 from being sheared or pulled away from the wall 36 of the bung as by a ragged or a knurled surface on the orifice wall. It was found that this protection was essential. A very tight fit of the ridge 40 in the orifice was needed, and except for the squeezing action of the shoulder 38 protecting the ridge 40, the ridge 40 moving against the orifice wall would be easily damaged. When the shoulder 38 moves beyond the orifice, it snaps outwardly and also permits the adjacent wall portion 36 to also snap outwardly to its full diameter and to press the ridge 40 against the wall of the orifice 23 with an intense pressure. The wall 36 of the bung is comparativey thick, and of a thickness which will create, by its resilient expansion, a significance outward force by the ridge 40 against the orifice wall 23. This force must be sufficient to exceed the elastic limit of a narrow line of the portion of the seal ridge 40 forming the contact of the ridge 40 against the wall. This causes the material to cold flow to form a narrow ring at this contact which flows into all ordinary irregularities in the orifice wall. It was established that a wall thickness of the bung sufficient to cold flow the contacting edge of the ring 40, with the proportions hereinbefore set forth, is approximately one-tenth the wall diameter, and that the proportions of the ridge 40 is approximately one-third the wall thickness. While the sizes of bung orifices are practically standardized throughout the industry, such proportions, above set forth, can be used to design comparable bung plugs of different size, with suitable variations in proportion being established by simple tests.

The resilient outward expansion of the wall 36 of the bung is supplemented by the hydrostatic pressure of carbonated beer within the barrel, and both effects combine to provide a plug which is effectively leakproof. Removal of the bung clearly shows a flattened ring on the seal ridge indicative of cold flow of the resin. The irregularities on this ring caused by small scratches, pits and knurl marks in the wall of the orifice 23 can be easily observed.

To enhance the radial thrust of the wall 36 against the bung orifice 23 to cold flow the ridge 40, various modifications of the unit are possible. The simple bung uan be reinforced by internal springs or ribs integral with the structure of the unit.

Other modifications to improve the use of the being are possible. One or more indentations 41 may be provided in the wall of the bung 30 to provide points of weakness to facilitate collapsing the wall 36 when the bung is to be extracted from an orifice 23. Another modification, not shown, would include a membrane across the rim 39 of the bung wall to eliminate an air pocket which may be formed by the bung when it is being driven into the orifice 23 in the barrel.

We claim:

1. A bung plug of a synthetic, thermoplastic resin having the general properties of a medium density polyethylene, for and in combination with, a bung orifice which tapers to converge inwardly and downwardly into a barrel, and comprising:

a top end closure;

a generally cylindrical sidewall structure depending therefrom, wherein the sidewall includes a wall section whose outer surface is sized to correspond with and to fit into the bung orifice;

a tapered skirt therebelow, generally larger in diameter than the sidewall, having a bottom rim adapted to fit into the bung orifice and a shoulder outstanding from the junction with the bottom of the wall section, whereby when the plug is driven into the bung orifice, the skirt is squeezed and the skirt and the wall section, adjacent to the skirt, are reduced in diameter until the skirt shoulder passes through the orifice and snaps outwardly therefrom to lock the plug into the orifice; and, a seal ridge circumscribing said wall section adjacent to the skirt formed as a comparatively narrow member whose height and width are approximately the same and whose height approaches the height of the shoulder; the thickness of said sidewall is approximately 1/10 the plug diameter and is proportioned to provide a resilient expansion pressure of the sealing ridge against the orifice sufficient to cold flow the contacting surface of the seal ridge and said thermoplastic sidewall is designed in cooperation with the skirt shoulder to provide adequate resistance to outward lateral deformation of said skirt by internal forces and thereby prevent contact of said seal ridge with the bung orifice while the bung is being driven into a barrel until the skirt shoulder is past said orifice whereby with said adjacent wall section being reduced in diameter when the plug is being driven into the bung orifice, the seal ridge is protected from being sheared off by dragging against the sides of the orifice, but tightly wedges against the orifice wall when the shoulder snaps into place.

2. In the structure set forth in claim 1, wherein the seal ridge is formed with a generally rounded surface circumscribing the wall.

References Cited

UNITED STATES PATENTS

| | | | |
|---|---|---|---|
| 501,058 | 7/1893 | Diebolt | 217—110 |
| 2,938,643 | 5/1960 | Geiser et al. | 217—98 |
| 3,028,036 | 4/1962 | Goll | 215—52 X |

RAPHAEL H. SCHWARTZ, *Primary Examiner.*

U.S. Cl. X.R.

220—24.5